Jan. 4, 1966 S. TESZNER 3,227,896

POWER SWITCHING FIELD EFFECT TRANSISTOR

Filed Feb. 17, 1964 4 Sheets-Sheet 1

INVENTOR
STANISLAS TESZNER
BY
Abraham A. Saffitz
ATTORNEY

INVENTOR
STANISLAS TESZNER
BY
Abraham A. Saffitz
ATTORNEY

INVENTOR
STANISLAS TESZNER
BY
Abraham A. Saffitz
ATTORNEYS

INVENTOR
STANISLAS TESZNER
BY
Abraham A. Saffitz
ATTORNEY

United States Patent Office 3,227,896

Patented Jan. 4, 1966

3,227,896

POWER SWITCHING FIELD EFFECT TRANSISTOR

Stanislas Teszner, 49 Rue de la Tour, Paris, France

Filed Feb. 17, 1964, Ser. No. 345,419
Claims priority, application France, Feb. 19, 1963, 925,330; Feb. 1, 1964, 962,388
9 Claims. (Cl. 307—88.5)

The present invention relates to semiconductor devices adapted to switch heavy electrical currents and, more particularly, to such devices adapted to controllably rectify, clip, cut off and regulate heavy alternating or direct currents within a large power range.

The power switching semiconductor devices of the invention derive from those disclosed in U.S. Patent No. 2,930,950 issued on March 29, 1960 to the present applicant and from U.S. Patent Application Ser. No. 243,793 filed December 12, 1962 also in the name of the present applicant. These semiconductor devices which are frequently called tecnetrons generally comprise a wafer-shaped base or body, a plurality of conductive channels substantially perpendicular to the base and integral therewith, two source and drain metallic electrodes, respectively in ohmic contact with the ends of the conductive channels and with the surface of the base, and a gate electrode forming a junction or a rectifying contact with said conductive channels. The application of a potential difference between the source and drain electrodes allows a flux of majority carriers to flow along the conductive channels and the application of a potential difference of predetermined amount and direction between an end ohmic electrode and the gate electrode stops this majority carrier flow. More generally the potential of the gate modulates by electric field effect the section of the carrier flux. According to whether the semiconductor body is of n-type or p-type, the drain electrode in contact with the base surface is the anode or the cathode of the device and the source electrode in contact with the ends of the conductive channels is the cathode or the anode.

The prior art semiconductor devices of the kind concerned have either outer conductive channels in the form of teeth or rods substantially perpendicular to the base or inner conductive channels in the form of elongated regions inside the semiconductor body, surrounded by another region, in a single piece and also inside the semiconductor body, having a type of conductivity opposite that of said body.

The prior art semiconductor devices of the kind concerned are generally used as amplifiers. It results that the junction or diode contact existing between the gate and the conductive channels must always be biased in the reverse direction so as to give the gate current an insignificant value with respect to the source-drain current and that the end contacts, at least the drain contact, has to be ohmic so as to prevent injection of minority carriers which would result in a significant increase of the gate current and consequently in a correlative decrease of the input resistance of the amplifier. These prior art semiconductor devices, although they are well adapted to be used as amplifiers, are unsuitable as power switching devices, particularly as controlled rectifier, limiter and circuit-breaker.

In fact, power switching devices comprise two different service conditions or states: the conducting state in which the device has to be as conductive as possible and the blocked state in which it has to be as isolating as possible. If in theb locked state the operation of a switching device is closely related to that of a blocked amplifier, contrarily in the conducting state its operation is quite different since its internal resistance must be near zero.

According to one feature of the invention, the drain electrode is constituted by a rectifying contact so established as to be equivalent to a diode in parallel with a nonlinear resistance. In this way, in the conducting state of the device, no voltage being applied between the gate and any end electrode, the current between the end electrodes comprises nearly equal numbers of majority and minority carriers. This results from the injection of minority carriers caused by the voltage drop across the diode (more precisely across the resistance shunting the diode), the injection rate being thus controlled by the current flowing through the device.

The numbers of majority and minority carriers being approximately equal, the term drain generally used for designating one of the end electrodes of a unipolar field effect transistor is not at all proper. The end electrodes of the devices will be termed in the following majority carrier source electrode, in brief majority source, and minority carrier source electrode, in brief minority source.

According to another feature of the invention, the gate electrode, in the conducting state of the device, is left floating, that is to say its bias potential is not derived from any bias voltage source but is only derived from the current flowing through the device. It results that the gate, is biased positively with respect to the conductive channel along a portion of its length and negatively along the remaining portion and consequently that it behaves at the same time as a collector and an injector of the carriers of both signs. In the conducting state, the bias potential of the gate is intermediate those of the majority and minority sources.

In order for the minority carriers heavily injected from the minority source not to be limited by the space charge they would form, to such an heavy minority carrier injection must correspond an heavy majority carrier injection from the majority source. If the majority source had as a circuit equivalent to its structure, like the minority source, a diode shunted by a nonlinear resistance, it would not be able to produce a majority carrier flow as dense as desired and this would result in a limitation in the minority carrier flow and consequently of the current strength per unit of the end electrodes of the device in its conducting state. For example, in a device constructed by the applicant, the majority and minority sources were both equivalent to a diode and a resistance in parallel and the current density on the surface of the base remained smaller than 1 ampere per square centimeter for a voltage drop across the device of approximately 2 volts. Such a density is insufficient for allowing the manufacture of switching semiconductor devices of small dimensions and low cost able of handling large electrical powers.

According to another feature of the invention, the semiconductor devices comprises, on the majority source side, a junction between the semiconductor regions constituting the conductive channels and a layer applied at the ends of these regions and heavily dopped in the same conductivity type as the same. Thus this junction is a $n\text{-}n^+$ or $p\text{-}p^+$ junction according to the type of conductivity of the semiconductor body which is often called a L-H junction and it behaves as a majority carrier injector.

As already said, the gate electrode develops in the blocked state a space charge inside the conductive channels. In order that this space charge can extend and completely pinch off the channels, two conditions must be filled:

(1) The extraction rate of the minority carriers from the under-gate region by the gate must be larger than their introduction rate into said region. These minority carriers issue either from the minority source acting as an injector or from thermal generation in the under-gate region. There is not much difficulty for extracting the thermally generated minority carriers since their generation time constant is larger by several magnitude orders than the time constant of their extraction. Contrarily, the extraction in due course of the carriers injected by the minority source is hard to accomplish.

(2) The minority carrier injection rate must rapidly decrease when the under-gate space-charge region extends. If so doing, the blocking process is activated and its duration is practically reduced to the setting-up time of the control voltage applied between the gate and one of the end electrodes for pinching-off the conductive channels.

In other words, two conditions are to be reconciled: (i) large-scale injection of charge-carriers from the terminal electrodes which results in a high carrier density in the channel in the "on" state; (ii) ability of a quick cancellation of such a high density in the "off" state by having the carriers already injected rapidly removed by the gate and simultaneously their injection stopped.

According to another feature of the invention, to meet these conditions the time for which the carriers are injected into the space below the gate is considerably greater than the time constant of carrier removal by the gate. To this end, the distance between the gate and the minority source electrode is greater than the smallest transverse dimension of the gate, and somewhere along such distance there is a trap layer which can readily be passed in the on state but which cannot be passed in the off state. The trap layer can be separate from or associated with the resistance-shunted diode system; if the trap layer is associated therewith, such system comprises an intermittent oxide layer having a trap layer at the oxide-semiconductor boundary.

The invention will be better understood, and its features and advantages made more clearly apparent, by the following detailed description, reference being made to the accompanying drawings wherein.

Figure 1:
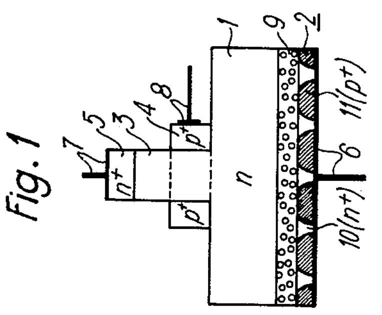

Referring to FIG. 1, an ideal basic heavy-duty semiconductor device comprises a base 1, made of an n-type semiconductor substance, and a number of conductive channels, only one—3—of which is illustrated in FIG. 1. As already stated, the channels 3 can be inside the semiconductor member, but in this particular case the single channel 3 is shown as a rod perpendicular to the base 1. A gate electrode 4 extends over some of the length of the rod 3 and cooperates therewith to form an n-p+ junction. The rod 3 terminates in a highly doped part 5 which forms an n-n+ junction with the rod 3. A highly doped p+ layer 2 is applied to the base 1 by deposition or diffusion and forms an n-p+ junction with the base 1. However, the layer 2 is not formed directly; it must be equivalent to a diode shunted by a resistance, and a trap layer can be placed either against the layer 2 or between the same and the conductive channels. Since the semiconductor member is of the n type, the terminal layer 2 forms an anode and the terminal layer 5 forms a cathode. The gate 4 serves to modulate the charge carrier flow through the channels. Connections 6, 7, 8 for the respective electrodes are also shown.

As stated in the opening part hereof, the distance between the gate 4 and the anode 2 which is the electrode injecting minority carriers—i.e., the distance to be travelled by the injected carriers in order to arrive below the gate—is appreciably greater than the gate inner radius—i.e., than the radius of the rod or appendix 3 (or than the smallest dimension thereof if the item 3 is not circular), the gate inner radius being the maximum distance which the minority carriers will have to travel in the space below the gate in order to be removed.

However, injection efficiency—i.e., the ratio between the number of carriers injected at one end and the number reaching the opposite end—decreases in direct proportion to the ratio between the high-level diffusion length—i.e., the high-carrier-density diffusion length—and the carrier path length from one end to the other. Injection efficiency falls off very rapidly when the last-mentioned ratio drops below half, and it is then very advisable to limit the thickness of the base 1 and, by way of compensation, to introduce means for delaying the arrival of the injected carriers at the gate, such means being in the form of a trap layer whose effectiveness varies in inverse proportion to the number of carriers—i.e., whose effectiveness is very reduced with the device on, and very great with the device off. The trap layer can be a diffused layer of atoms of appropriate metals or a trap layer adjacent an oxide layer of the semiconductor member.

In FIG. 1, a trap layer 9, for instance, a layer of nickel atoms, is introduced in the base 1 by diffusion. Gold or manganese or copper or zinc or cobalt or silver or iron can be used instead of nickel. Preferably, elements are used which can introduce energy levels situated in the central area of the forbidden band of the semiconductor substance used—i.e., manganese or iron or copper or cobalt or nickel or silver, in the case of germanium, and zinc or manganese or iron or copper or gold, in the case of silicon.

Figure 9:
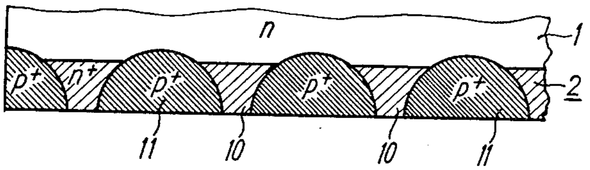
FIGS. 9 and 10 are views of details of the minority source electrode.

Once the trap layer has been formed, the junction 1, 2, which must be equivalent to a resistance-shunted diode, is formed. One of the following processes can be used to this end:

Referring to FIGS. 1 and 9, an impurity formed by an element from Group V of the Periodic Table, for instance phosphorus, is first diffused onto the base 1 and forms an overdoped n+ layer 10, whereafter a group III impurity, such as boron, is diffused through a mask (which can be a silicon oxide mask if the n-type semiconductor used is silicon) in a concentration considerably higher than the concentration of phosphorus; for instance, the boron concentration can be $10^{20}/\text{cm.}^3$ and the phosphorus concentration can be $10^{18}/\text{cm.}^3$. Zones 11 are therefore produced which form diodes (p+, n) separated by n+ zones 10 forming resistances shunted across the diodes.

Figure 10:
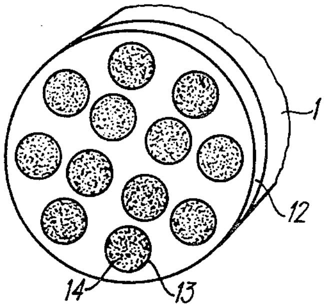

FIG. 10 illustrates a second process for forming a resistance-shunted diode. The base 1 is assumed in this case to be n-type germanium. A wafer 12 of a metal from Group III of the periodic table, for instance, indium, is applied to the base 1. The wafer 12 is pierced with apertures 13 in which are placed pastilles 14 containing an element from Group V of the Periodic Table. The latter element can be an alloy containing 5 percent of antimony and 95 percent of tin. The wafer 12 with the pastilles 14 is alloyed with the base 1 by the two items 12, 1 being heated, while in engagement with one another, to a temperature of from 500 to 600° C. All those parts of the wafer 12 which are devoid of pastilles 14 cooperate with the base 1 to form the diode 1, 2 of FIG. 1, the pastilles forming the shunt resistors 10.

Figure 2:
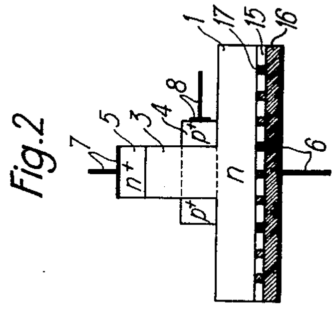
FIGS. 1 and 2 illustrate single-appendix type ideal basic semiconductor devices, two ways being shown of forming the minority source with a resistance-shunted diode and with a trap layer.
Figure 13:
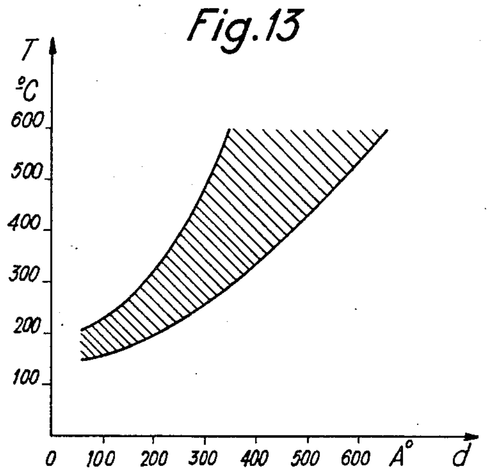
FIG. 13 gives curves explaining a process for forming a resistance-shunted diode at the minority source electrode.

Referring to FIG. 2, the obstacle which can be passed at a high level of injection is formed by an oxide layer with a trap layer adjacent the oxide-semiconductor boundary, the oxide layer being the constituent element of the minority source diode. In FIG. 2, elements which are unchanged as compared with FIG. 1 have the same reference numerals as in the latter. An oxide layer 15 is formed on the end face of the base 1 by any known means, for instance, by prolonged heating in a highly oxidizing atmosphere or by treatment in a high concentration (from 30 to 35%) of boiling hydrogen peroxide, whereafter a metal electrode 16 is welded to such end face by means of a lead-tin alloy at a temperature such that the oxide layer is pierced at discrete places 17. The places 17 have a nonlinear resistance characteristic. FIG. 13 illustrates two curves limiting the range for the temperature T at which the welding must be performed for local piercing of an oxide layer *d* angstroms thick.

The wafer 16 need not be a semiconductor substance, but formation of the diode 1, 16 is facilitated if the wafer 16 is a wafer of a semiconductor substance (an indium wafer if the member 1 has n-type conductivity) or of a metal containing a semiconductor substance (a gold-antimony wafer if the member 1 has p-type conductivity).

Figure 3:
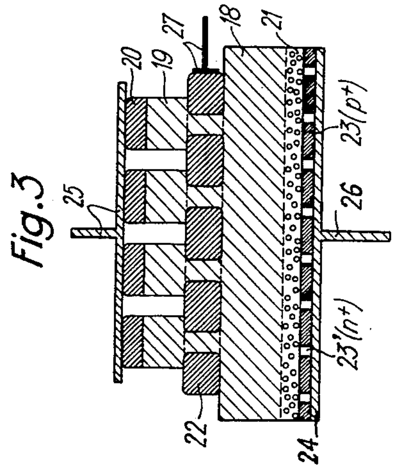
FIGS. 3 and 4 illustrate the actual structures of heavy-duty semiconductor devices according to the invention in the case where the conductive channels are external and in shape resemble rods.

The device illustrated in FIG. 3 has the basic structure shown in FIG. 1 and comprises a base 18 from which a number of rods 19 start. This structure is produced in a semiconductor wafer (for instance, n-type germanium or silicon) by an ultrasonic cutting process, whereafter the structure is chemically polished in an appropriate etching bath such as, in the case of germanium, a CP6 bath containing 15 cm.$^3$ of hydrofluoric acid, 15 cm.$^3$ of acetic acid and 30 cm. of nitric acid. The rod apexes are then tinned by being covered by a tin weld 20 comprising an element from Group V and consisting, for instance, of 5% of antimony, 50% of lead and 45% of tin. As is known in the prior art, adding antimony to the weld leads to overdoping of the adjacent semiconductor—i.e., to forming the $n^+$ layer on the rod apexes. After further treatment in the chemical etching bath the structure is protected by being covered with a cellulose varnish. However, the base surface is left unvarnished and covered with a nickel deposit, for instance, by electrolytic deposition or by vacuum coating or by hot chemical deposition. This nickel layer will subsequently form a trap layer 21 and is introduced inside the semiconductor in a manner which will be described hereinafter. The protective varnish is then dissolved, the structure is covered at the top by a plate of a Group III metal, for instance indium, pierced with as many apertures as there are rods which will subsequently form a gate electrode 22, and a wafer 23 of the same metal comprising pastilles 23' is placed against the base 18 to form the $p^+$ part of the $p^+$-n junction 18–23. A metal wafer 24 of a relatively high-melting-point metal completes the structure which is placed in a mould for heat treatment at a temperature of some 550° C. to simultaneously form the $n^+$-n junction at the rod apexes, the indium-germanium alloy forming the $p^+$-n junction at the gate, the shunted minority source junction and the weld of the metal wafer. Simultaneously in this process, the nickel atoms diffuse from the base and produce, as mentioned, a trap layer 21 in front of the $p^+$ part 23 of the minority source. The contours of these junctions and of the adjacent surfaces of the semiconductor are then cleaned electrolytically, whereafter the device is potted in an insulating resin, for instance, a silicone and/or phenol resin (this potting is not shown) but with the outside surface of the base electrode 24 and with the welds 20 on the rod apexes being left exposed. All that then remains to be done is to weld thereto a metal electrode with a connection 25 and lead-out connections 26, 27 respectively and to enclose the whole in a box (not shown) having access terminals.

The device illustrated in FIG. 4 corresponds to the basic structure illustrated in FIG. 2 and differs basically therefrom only in the formation of its minority source which is produced on a surface which, in addition to having been polished in a chemical etching bath, has also been oxidized to a depth of from one hundred to a few hundreds of angstroms, in accordance with the temperature at which the contact will subsequently be welded. This oxide layer 29 is initiated just after the polishing process but is thickened subsequently by oxidation in air or in an oxygen stream, the duration and temperature of this step being dependent upon the required thickness of the subsequent oxide layer. The welding of the metal wafer 30 and of the electrode 24 previously welded thereto to the base 18 through the oxide layer 29 can be performed simultaneously with the alloying of the gate 22 to the rods 19 and with the junctions ($n^+$, n) to the rod apexes, the thickness of the oxide being such as to permit piercing at discrete places at a temperature of about 550° C. If the formation temperature of the resistance-shunted diode is lower and is, for instance, some 150° C., the ($p^+$, n) junctions 19–22 and ($n^+$, n) junction 19–20 are formed first, whereafter the oxide layer 29 is formed and the system 30, 24 is welded thereto.

Figure 5:
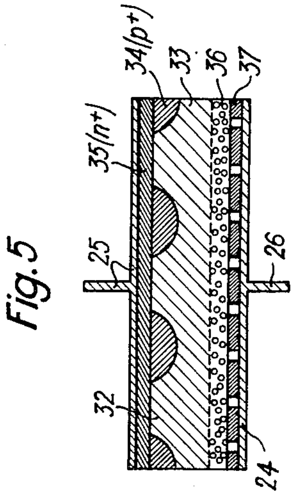
FIGS. 5 and 6 illustrate actual constructions of heavy-duty semiconductor devices according to the invention of the kind wherein the conductive channels are internal and are bounded by a zone of the semiconductive member of opposite conductivity to the channel zone.
Figure 4:
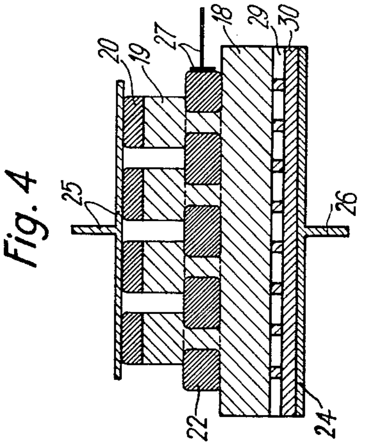
Figure 6:
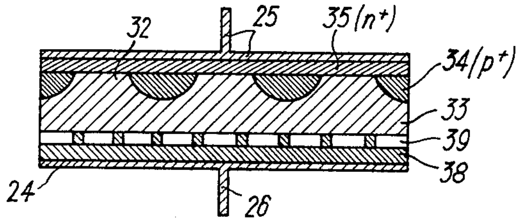

The semiconductor structures illustrated in FIGS. 3 and 4 have external conductive channels, but FIGS. 5 and 6 illustrate semiconductor structures having internal conductive channels.

Channels 32 are inside a semiconductor wafer 33, for instance, of the n-type, and are separated from one another and surrounded by a $p^+$-type lattice 34. A ($n^+$, n) junction 33–35 is formed on one surface of the wafer 33 and, in the particular case of FIG. 5, a trap layer 36 is formed, whereafter a resistance-shunted diode 33–37 is formed in the manner specified with reference to FIG. 3. In FIG. 6, however, a resistance-shunted diode 33–38 is formed on an oxide layer 39.

Figures 7, 8:
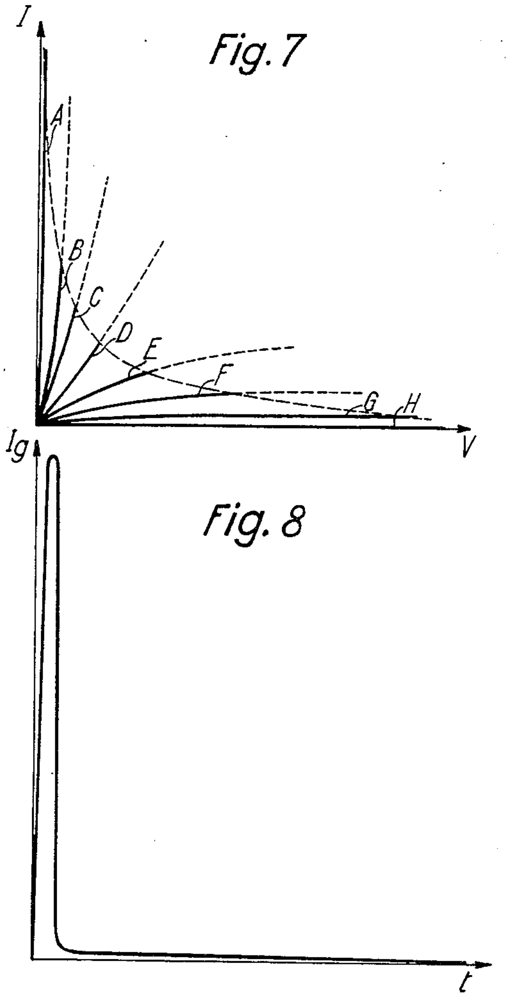
FIG. 7 illustrates a current-voltage curve between the majority source and the minority source for different gate electrode bias voltages.
FIG. 8 shows the gate current versus time curve relationship during switching off.

FIG. 7 illustrates the current-voltage characteristics for different gate bias voltages (curves A to H). With the device on (curve A), the gate is insulated from the majority source electrode and from the minority source electrode—i.e., the gate potential floats—and the curves B to H correspond to gate bias voltages of increasing amplitude in relation to the negative minority source, the curve H corresponding to complete pinchoff. This family of characteristic curves has an original pattern which is distinctive of the device according to the invention, for in the top half of the quadrant the curves have the typical curvature of a diode characteristic, especially where the curves are near the current axis, but in the bottom half the curvature reverses and resembles a pentode characteristic, particularly where the curves are near the voltage axis. The chain-line curve which intersects the characteristics at the end of their solid-line portions corresponds to the maximum operating power for given cooling conditions.

The advantages of such a family of curves will be immediately apparent, since they show very clearly the fact that the device has a low static resistance when conductive and a high resistance when nonconductive. Similar considerations apply to the corresponding internal (differential) resistances. The gate current decreases as the resistances increase and becomes relatively low in steady cutoff conditions. However, there is a large gate current peak when a negative voltage is applied to the gate, and this peak denotes the removal of the minority carriers in the channel at the instant of application of such negative voltage. FIG. 8 shows how the gate current $i_g$ varies with time during the switching-off process; the peak can be seen and is of very short duration—as a rule, something like 1 microsecond.

The electrical characteristics of a typical semiconductor device according to this invention will now be listed:

Material used: germanium whose resistivity is fairly high but fairly far away from the intrinsic value ($N_d$—$N_a$), being from $5.10^{12}$ to $1.5.10^{13}$.

Current density in base 20 A./cm.$^2$

Terminal voltage drop when on: 2 volts

Complete pinchoff voltage: from 50 to 100 volts

Maximum operating voltage: 150 to 200 volts

Maximum permissible reverse voltage between the gate and the minority carrier in the off state—approximately 400 to 500 volts.

There are about from 50 to 100 rods per cm.$^2$ and the structure has an overall height of some 1 to 1.5 mm.

Figure 11:
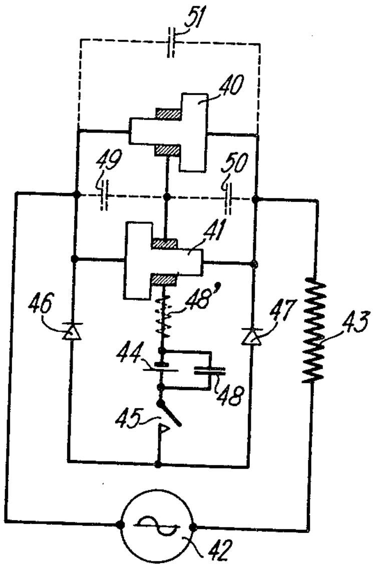
FIGS. 11 and 12 are circuit diagrams for the semiconductor device according to the invention as an A.C. switching device and as a controlled rectifier.
Figure 12:
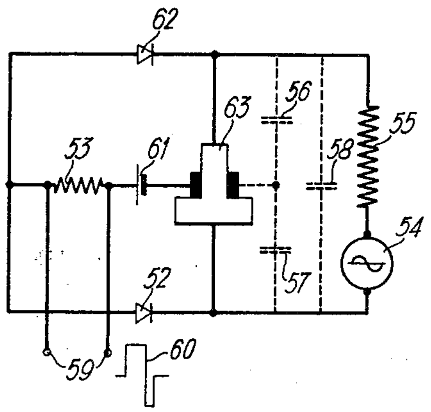

FIGS. 11 and 12 illustrate circuit diagrams for the interruption (FIG. 11) and control rectification (FIG. 12) of an alternating current.

The circuit illustrated in FIG. 11 comprises two asymmetric tecnetrons 40, 41 connected in a head-to-tail arrangement and directly connected in parallel with one another; the arrangement formed by the two tecnetrons is placed in series with an A.C. source 42 and a load 43. A factor complicating gate control here is that, since the end contacts alternately become the majority source and the minority source, the control voltage must be applied alternately between the gate and either end, for to cut off the current the voltage between the gate and any end electrode must be at least equal to the complete pinchoff voltage $V_o$. If, therefore, the control voltage were to be applied just between the gate and one of the ends, to meet the condition just specified the control voltage would have to be $(V_o+V_s)$, $V_s$ denoting the voltage of the source 42. The control voltage between the gate and the uncontrolled end would then rise to $V_o+2V_s$ when such end was the minority carrier. It will therefore be apparent that, for the same safety factor as is used for the reverse performance of the gate diode with the device off, the permissible operating voltage would be half as low as in the case where the control voltage would be $V_o$. Thus means are to be provided for having the control voltage applied between the gate and one or the other electrode alternately, the electrode concerned always being the majority source at the particular half-cycle of the alternating current.

The system illustrated in FIG. 11 obviates this difficulty. A biasing source 44 for the gate and a switch 45 are connected to the two terminals of the parallel head-to-tail tecnetrons 40, 41 through the agency of two diodes 46, 47 disposed one each in each tecnetron biasing circuit. The purpose of these diodes 46, 47 is to bias the gate relatively to whichever of the two terminals is more negative at any particular time. A capacitance 48 connected across the bias source 44 serves to store the energy which will subsequently be required for the gate current peak at the start of the cut-off process, this peak being illustrated in FIG. 8. Optional elements of the system are shown in chain lines and are a resistor 48, capacitors 49, 50 for adjusting the time constant for setting up the voltage between the gate and whichever electrode is connected at the particular time concerned, and a capacitor 51 for adjusting the rate at which the voltage across the tecnetrons is restored.

FIG. 12 illustrates a circuit diagram for a controlled rectifier embodying a power tecnetron. An A.C. source 54 and a load 55 are connected in series across a power tecnetron 63. The bias circuit comprises a biasing source 61, a resistor 53 and two diodes 52, 62 which perform the same function as the diodes 46, 47 of FIG. 11. The circuit diagram given in FIG. 12 is based on control systems for grid-type mercury vapour rectifiers and inverters, the tecnetron being cut-off by a D.C. voltage of appropriate sign which is supplied by the source 61 and applied permanently, the tecnetron being opened at and for the required times by pulses of opposite sign which cancel the voltage on the gate. Such pulses 60 are applied to terminals 59 of the resistor 53 in the gate circuit. As FIG. 12 shows, the opening pulse is followed by a pulse of opposite sign to ensure instantaneous cutoff after the required opening time. As an optional feature, capacitors 56, 57 can be connected one each between the gate and each end of the tecnetron, and a capacitor 58 can be connected to the end terminals to adjust, if required, the rates of variation of the opening and closing voltage, between the gate and each of the ends and between the ends of the tecnetron.

In FIG. 12 the gate is not at a floating potential during the conductive period of the device, but if the value of the resistor 53 is greater than the internal resistance of the device when on, the gate is biased by the current flowing through the device and not by the much smaller current flowing through the resistor 53. For instance, assuming that the current with the device on is 10 amperes for a drop of 2 volts across the terminals, then the internal resistance is 0.2 ohm, and the resistor 53 can be 5 ohms.

The advantage of the system illustrated in FIG. 12 is that it can provide controlled rectification of any proportion of the alternating cycle which is required without any need to place a power diode in series; a power diode, in addition to increasing cost considerably, increases the voltage drop—and therefore the power loss—in the conductive state. The system illustrated in FIG. 12 offers every facility for rectifying polyphase currents with substantially no limit to the number of phases which can be dealt with, besides having the advantage in general of providing a substantially "as-required" modulation of the A.C.

It will be apparent that various changes can be made in the semiconductor substances and in the construction of the embodiments of the invention without departing from the spirit and scope thereof.

What I claim is:

1. A heavy duty semiconductor switching device comprising a base made of a semiconductive substance of one type of conductivity, a number of first elongated regions substantially perpendicular to the base, having the same type of conductivity as the latter and unitary therewith, a second region extending over part of the extent of the first regions and forming a rectifying junction therewith, zones heavily doped with the same type of conductivity as the said first regions disposed at the ends thereof, an intermittent layer near the base surface and heavily doped with a type of conductivity opposite to the type of conductivity of the base, and a number of third regions of the same type of conductivity and integral with the base and scattered in said intermittent layer whereby the same is equivalent to a resistance-shunted diode, and connections to the end zones, the second region and the intermittent layer.

2. A heavy duty semiconductor switching device comprising a base made of a semiconductive substance of one type of conductivity, a number of first elongated regions substantially perpendicular to the base, having the same type of conductivity as the latter and unitary therewith, a second region extending over part of the extent of the first regions and forming a rectifying junction therewith, zones heavily doped with the same type of conductivity as the said first regions disposed at the ends thereof, an intermittent layer near the base surface and heavily doped with a type of conductivity opposite to the type of conductivity of the base, a number of third regions of the same type of conductivity and integral with the base and scattered in said intermittent layer whereby the same is equivalent to a resistance-shunted diode, a trap layer inserted between said elongated first regions and said intermittent layer, and connections to the end zones, the second region and the intermittent layer.

3. A heavy duty semiconductor switching device comprising a base made of a semiconductive substance of one type of conductivity, a number of first elongated regions substantially perpendicular to the base, having the same type of conductivity as the latter and unitary therewith, a second region extending over part of the extent of the first regions and forming a rectifying junction therewith, zones heavily doped with the same type of conductivity as the said first regions disposed at the ends thereof, an intermittent layer of the oxide of the semiconductive substance provided on the base surface, a metal wafer applied to the oxide layer, portions of the metal of the wafer filling the gaps in the intermittent oxide layer and contacting the semiconductive substance of the base through said gaps, whereby the intermittent layer is equivalent to a resistance-shunted diode, and connections to the end zones, the second region and the wafer.

4. A heavy duty semiconductor switching device as set forth in claim 3 wherein the base is made of a n-type semiconductive substance and the metal wafer applied to the oxide layer is made of a metal of Group III of the Periodic Table.

5. A heavy duty semiconductor switching device as set forth in claim 3 wherein the base is made of a p-type semiconductive substance and the metal wafer applied to the oxide layer is made of an alloy comprising a substance from Group V of the Periodic Table.

6. A heavy duty semiconductor switching device comprising a base made of a semiconductive substance of one type of conductivity, a number of first elongated regions substantially perpendicular to the base, having the same type of conductivity as the latter and unitary therewith, a second region extending over part of the extent of the first regions and forming a rectifying junction therewith, zones heavily doped with the same type of conductivity as the said first regions disposed at the ends thereof, an intermittent layer near the base surface and heavily doped with a type of conductivity opposite to the type of conductivity of the base, the thickness of the base between the surface thereof and the first elongated regions perpendicular thereto being larger than the minimal cross-section of any such first region, and a number of third regions of the same type of conductivity and integral with the base and scattered in said intermittent layer, whereby the same is equivalent to a resistance-shunted diode, and connections to the end zones, the second region and the intermittent layer.

7. A heavy duty semiconductor switching device comprising a base made of a semiconductive substance of one type of conductivity, a number of first elongated regions substantially perpendicular to the base, having the same type of conductivity as the latter and unitary therewith, a second region extending over part of the extent of the first regions and forming a rectifying junction therewith, zones heavily doped with the same type of conductivity as the said first regions disposed at the ends thereof, an intermittent layer near the base surface and heavily doped with a type of conductivity opposite to the type of conductivity of the base, the thickness of the base between the surface thereof and the first elongated regions perpendicular thereto being larger than the minimal cross-section of any such first region, a number of third regions of the same type of conductivity and integral with the base and scattered in said intermittent layer, whereby the same is equivalent to a resistance-shunted diode, a trap layer inserted between said elongated first regions and said intermittent layer, and connections to the end zones, the second region and the intermittent layer.

8. A heavy duty semiconductor switching device comprising a base made of a semiconductive substance of one type of conductivity, a number of first elongated regions substantially perpendicular to the base, having the same type of conductivity as the latter and unitary therewith, a second region extending over part of the extent of the first regions and forming a rectifying therewith, zones heavily doped with the same type of conductivity as the said first regions disposed at the ends thereof, an intermittent layer of the oxide of the semiconductive substance provided on the base surface, a metal wafer applied to the oxide layer, the thickness of the base between the surface thereof and the first elongated regions perpendicular thereto being larger than the minimal cross-section of any such first region, portions of the metal of the wafer filling the gaps in the intermittent oxide layer and contacting the semiconductive substance of the base through said gaps, whereby the intermittent layer is equivalent to a resistance-shunted diode, and connections to the end zones, the second region and the wafer.

9. A heavy duty semiconductor switching device as set forth in claim 2 wherein said intermittent layer forms with said base scattered diode regions, said third regions form in said intermittent layer scattered resistive ohmic regions interspersed among said diode regions; and comprising a load circuit connected between said end zones and intermittent layer, means for biasing said second region in the reverse direction in the "off" state of the switching device and means for biasing said second region at a voltage intermediate between the voltage of said end zones and intermittent layer in the on state of the switching device.

References Cited by the Examiner

UNITED STATES PATENTS

| | | | |
|---|---|---|---|
| 2,930,950 | 3/1960 | Teszner | 317—235 |
| 3,025,438 | 3/1962 | Wegener | 317—235 |

OTHER REFERENCES

Erikson, A., New Tecnetrons Switch 15 Amp., Electronics, Sept. 6, 1963 (page 75).

JOHN W. HUCKERT, *Primary Examiner.*

R. SANDLER, *Examiner.*